Patented Oct. 4, 1932

1,880,646

UNITED STATES PATENT OFFICE

OTTO WULFF, OF HOFHEIM-IN-TAUNUS, GERMANY, ASSIGNOR TO I. G. FARBEN-INDUSTRIE AKTIENGESELLSCHAFT, OF FRANKFORT-ON-THE-MAIN, GERMANY

PROCESS FOR SULPHONATING PYRIDINE AND ITS HOMOLOGUES

No Drawing. Application filed November 6, 1929, Serial No. 405,288, and in Germany November 26, 1928.

The present invention relates to a process for sulphonating pyridine and its homologues.

The sulphonation of pyridine has already been described in the literature; processes were used according to which the sulphonation is effected at a very high temperature (above 300° C.) by boiling for many hours with sulphuric acid. In order to shorten the duration of boiling, also catalysts have already been used, such as aluminium, magnesium, chromium, potassium and ferric salts; vanadyl suphate was likewise mentioned as a suitable catalyst, the yields, however, which are obtained when using these catalysts, are very bad.

Now I have found that by the use of mercury or a salt thereof as catalyst when sulphonating the pyridine and its homologues the entrance of the sulphonic acid residue into the pyridine ring occurs already at considerably lower temperatures namely between 190° C. and 270° C. It is preferably worked at temperatures of between 200° C. and 250° C., that is to say at about 225° C. The β-pyridine-sulphonic acid as well as its partly hitherto unknown homologues have thus become easily accessible compounds.

The following examples serve to illustrate the invention, but they are not intended to limit it thereto.

1. 200 grams of fuming sulphuric acid containing 20% of $SO_3$ are mixed while stirring with 1 gram of basic mercury sulphate in a flask having a capacity of ¼ liter and 36 grams of α-picoline are gradually entered drop by drop in the course of about ½ hour, whereby the mass is spontaneously heated to 110° C. The whole is then heated in the sand bath to 225° C. and kept at this temperature for about 3½ hours while stirring. After cooling the clear brownish solution is introduced while stirring into about 1 liter of ice water and the sulphuric acid is precipitated by means of about 220 grams of calcium carbonate so that the reaction is finally neutral. The whole is then filtered by suction from calcium sulphate, well washed and while furthermore adding 15 grams of calcium carbonate the filtrate is distilled with steam until the distillate does no longer show an alkaline reaction.

The residue left after distillation contains the α-picoline-sulphonic acid as calcium salt which can be obtained therefrom in a pure form in the usual manner by removing the calcium sulphate still dissolved. The calcium salt can also be transformed with the calculated quantity of sulphuric acid into the free acid; it is, however, preferable to precipitate at boiling temperature by means of a solution of sodium carbonate or of potassium carbonate, until the liquid constantly shows an alkaline reaction to phenolphthalein; for this purpose there are required for instance 15.5 grams of calcinated soda; the whole is hot filtered and the solution of the sodium or potassium salt is evaporated to dryness on an open flame. Thus for instance 45 grams of crude sodium α-picoline-sulphonate are obtained, that is to say 56%. 41% of unchanged α-picoline can be volumetrically determined from the steam distillate and be recovered as such, so that the total yield is nearly quantitative.

The sulphonic acid salts are faintly brownish colored substances which can easily be pulverized. They are readily soluble in water, even in cold water, and slowly attract moisture when standing at the air.

2. In the same manner as described in Example 1 for α-picoline, pyridine is sulfonated at 225° C. while using mercury as catalyst. β-pyridine-sulphonic acid is obtained in a yield of 37%, whilst 58% of unreacted upon pyridine are recovered.

3. In the same manner as described in Example 1 for α-picoline, γ-picoline is sulphonated at 220° C.–225° C. mercury being used as a catalyst. The γ-picoline-β-sulphonic acid is obtained in the same good yield as the α-picoline-β-sulphonic acid.

The γ-picoline-β-sulphonic acid and the salts thereof are colorless substances which are easily soluble in water. It has the following formula:

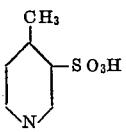

4. α-methyl-β'-ethyl-pyridine

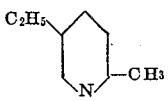

can likewise be transformed in the same easy manner into the sulphonic acid

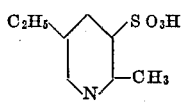

The proportions of solubility of the sulphonic acid and its salts are similar to those of the homologous compounds.

In the same manner there may be sulphonated the other pyridines with free β-position substituted by one or several lower or higher alkyls.

There can be used as catalysts besides basic mercury sulphate also any other mercury salts. All of them are transformed during the reaction like the mercury into mercury sulphate.

I claim:

1. The sulphonation process which consists in heating to 190° C.–270° C. a compound of the following general formula:

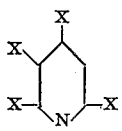

wherein X stands for hydrogen or at most two X's stand for alkyl, with a multiple quantity of concentrated sulphuric acid containing $SO_3$ in the presence of a small quantity of a mercury salt, and then working up the product in the usual manner.

2. The sulphonation process which consists in heating to 200° C.–250° C. a compound of the following general formula:

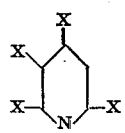

wherein X stands for hydrogen or at most two X's stand for alkyl, with a multiple quantity of concentrated sulphuric acid containing $SO_3$ in the presence of a small quantity of a mercury salt, and then working up the product in the usual manner.

3. The sulphonation process which consists in heating to about 225° C. a compound of the following general formula:

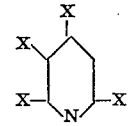

wherein X stands for hydrogen or at most two X's stand for alkyl, with a multiple quantity of concentrated sulphuric acid containing $SO_3$ in the presence of a small quantity of a mercury salt, and then working up the product in the usual manner.

4. The sulphonation process which consists in heating to 190° C.–270° C. compounds of the following general formula:

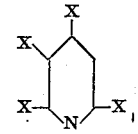

wherein X stands for hydrogen or at most two X's stand for methyl, with a multiple quantity of concentrated sulphuric acid containing $SO_3$ in the presence of a small quantity of a mercury salt, and then working up the product in the usual manner.

5. The sulphonation process which consists in heating to 200° C.–250° C. a compound of the following general formula:

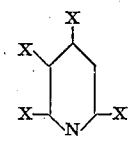

wherein X stands for hydrogen or at least two X's stand for methyl, with a multiple quantity of concentrated sulphuric acid containing $SO_3$ in the presence of a small quantity of a mercury salt, and then working up the product in the usual manner.

6. The sulphonation process which consists in heating at about 225° C. a compound of the following general formula:

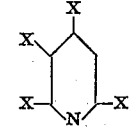

wherein X stands for hydrogen or at least two X's stand for methyl, with a multiple quantity of concentrated sulphuric acid containing $SO_3$ in the presence of a small quantity of a mercury salt, and then working up the product in the usual manner.

7. The sulphonation process which consists in heating to 190° C.-270° C. a compound of the following general formula:

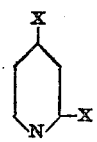

wherein one X stands for hydrogen, the other X for hydrogen or methyl, with a multiple quantity of concentrated sulphuric acid containing SO$_3$ in the presence of a small quantity of a mercury salt, and then working up the product in the usual manner.

8. The sulphonation process which consists in heating to 200° C.-250° C. a compound of the following general formula:

wherein one X stands for hydrogen, the other X for hydrogen or methyl, with a multiple quantity of concentrated sulphuric acid containing SO$_3$ in the presence of a small quantity of a mercury salt, and then working up the product in the usual manner.

9. The sulphonation process which consists in heating to about 225° C. a compound of the following general formula:

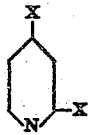

wherein one X stands for hydrogen, the other X for hydrogen or methyl, with a multiple quantity of concentrated sulphuric acid containing SO$_3$ in the presence of a small quantity of a mercury salt, and then working up the product in the usual manner.

10. The sulphonation process which consists in heating for 3-4 hours to 190° C.-270° C. pyridine with 5-6 times the quantity of concentrated sulphuric acid containing about 20% of sulphuric anhydride in the presence of a small quantity of a mercury salt and then working up the product in the usual manner.

11. The sulphonation process which consists in heating for 3-4 hours to 200° C.-250° C. pyridine with 5-6 times the quantity of concentrated sulphuric acid containing about 20% of sulphuric anhydride in the presence of a small quantity of a mercury salt and then working up the product in the usual manner.

12. The sulphonation process which consists in heating for 3-4 hours to about 225° C. pyridine with 5-6 times the quantity of concentrated sulphuric acid containing about 20% of sulphuric anhydride in the presence of a small quantity of basic mercury sulphate and then working up the product in the usual manner.

13. The sulphonation process which comprises heating to 190° C.-270° C. α-picoline with a multiple quantity of concentrated sulphuric acid containing SO$_3$ in the presence of a small quantity of a mercury salt.

14. The sulphonation process which comprises heating to 190° C.-270° C. γ-picoline with a multiple quantity of concentrated sulphuric acid containing SO$_3$ in the presence of a small quantity of a mercury salt.

In testimony whereof, I affix my signature.

OTTO WULFF.

CERTIFICATE OF CORRECTION.

Patent No. 1,880,646. October 4, 1932.

OTTO WULFF.

It is hereby certified that error appears in the printed specification of the above numbered patent requiring correction as follows: Page 2, lines 109 and 124, for "least" read "most"; and that the said Letters Patent should be read with this correction therein that the same may conform to the record of the case in the Patent Office.

Signed and sealed this 21st day of February, A. D. 1933.

M. J. Moore,
Acting Commissioner of Patents.

(Seal)